(12) United States Patent
Johnson, Jr.

(10) Patent No.: US 11,618,141 B2
(45) Date of Patent: Apr. 4, 2023

(54) INSTALLATION TOOL

(71) Applicant: Caterpillar Inc., Peoria, IL (US)

(72) Inventor: Paul Frederick Johnson, Jr., Victoria, TX (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 17/446,718

(22) Filed: Sep. 2, 2021

(65) Prior Publication Data

US 2023/0066412 A1    Mar. 2, 2023

(51) Int. Cl.
| | | |
|---|---|---|
| *B25B 27/00* | (2006.01) | |
| *B25D 1/16* | (2006.01) | |
| *B23P 19/04* | (2006.01) | |
| *B23P 19/08* | (2006.01) | |

(52) U.S. Cl.
CPC ............ *B25B 27/0028* (2013.01); *B25D 1/16* (2013.01); *B23P 19/047* (2013.01); *B23P 19/084* (2013.01); *B25B 27/0092* (2013.01); *Y10T 29/5393* (2015.01); *Y10T 29/53657* (2015.01); *Y10T 29/53891* (2015.01); *Y10T 29/53987* (2015.01)

(58) Field of Classification Search
CPC ............ B25B 27/0028; B25B 27/0092; B23P 19/047; B23P 19/084; Y10T 29/53657; Y10T 29/53987; Y10T 29/53891
See application file for complete search history.

(56) References Cited

U.S. PATENT DOCUMENTS

| | | |
|---|---|---|
| 3,861,020 A | 1/1975 | Moewe |
| 4,907,811 A | 3/1990 | Nash et al. |
| 5,090,102 A | 2/1992 | Lovell |
| 5,709,018 A | 1/1998 | Dugan |
| 6,571,819 B1 | 6/2003 | Capoferi |
| 6,880,217 B2 | 4/2005 | Garst |
| 10,870,190 B2 | 12/2020 | DeMaria |

(Continued)

FOREIGN PATENT DOCUMENTS

| | | | |
|---|---|---|---|
| CN | 1071874 A | * | 5/1993 |
| CN | 209478099 U | | 10/2019 |

(Continued)

OTHER PUBLICATIONS

Written Opinion and International Search Report for Int'l. Patent Appln. No. PCT/US2022/042105, dated Nov. 29, 2022 (10 pgs).

*Primary Examiner* — Jermie E Cozart
(74) *Attorney, Agent, or Firm* — von Briesen & Roper, s.c.

(57) ABSTRACT

An installation tool for installing a seal includes a shaft and a seal-engaging component coupled with the shaft. During an installation of the seal, the seal-engaging component is adapted to couple with the seal. The seal-engaging component includes a first surface and a second surface. The seal-engaging component also includes a first annular ring extending from the first surface and adapted to engage with the seal for coupling the seal with the seal-engaging component. The seal-engaging component further includes a second annular ring extending from the first surface. The installation tool also includes a sliding hammer adapted to slide along a length of the shaft. During the installation of the seal, the sliding hammer is adapted to apply a force to the seal-engaging component for installing the seal at a seal installation location.

12 Claims, 5 Drawing Sheets

(56) References Cited

U.S. PATENT DOCUMENTS

| | | |
|---|---|---|
| 2002/0178870 A1 | 12/2002 | Lowther |
| 2007/0157764 A1 | 7/2007 | Williams |
| 2014/0290020 A1 | 10/2014 | Radhakrishnan et al. |
| 2020/0406437 A1 | 12/2020 | Maldonado et al. |

FOREIGN PATENT DOCUMENTS

| | | | |
|---|---|---|---|
| JP | 2018040431 A | * | 3/2018 |
| JP | 6826845 B2 | | 2/2021 |

* cited by examiner

INSTALLATION TOOL

TECHNICAL FIELD

The present disclosure relates to an installation tool for a seal, and more particularly, a seal-engaging component associated with the installation tool and a method of installing a seal using the installation tool.

BACKGROUND

Many machine components include seals that are installed to prevent leakage of liquids or gases therethrough. In some examples, the seal may have to be periodically replaced as they wear out. Typically, the seal is installed by an operator. Further, a seal installation process is a time consuming process.

Conventionally, hammers are used for installing the seal. For example, the operator may place the seal at a seal installation location and hit the seal by the hammer for installing the seal. Such an approach may create pinch points on the seal and may cause damage to the seal, thereby affecting sealing properties of the seal. In some instances, forces applied by the hammer may also damage one or more components that are disposed proximate to the seal installation location. Further, it may be challenging to install seals in confined spaces using the hammer. Moreover, in some cases, the hammer may cause injury to the operator during the seal installation process, which is not desirable.

Conventional tools for installing the seals do not typically include a means to hold the seal in place while the seal is being located at the seal installation location. For example, the seal may have to be held by the operator or a separate component may have to be used to hold the seal in place. Further, a misalignment of the seal during the seal installation process may lead to incorrect installation of the seal and may affect sealing properties at the seal installation location. Thus, it may be desirable to have a technique for installing the seals that addresses the abovementioned challenges.

Chinese Patent Number 209478099U describes a tool for installing a crankshaft oil seal of a heavy-duty car engine and relates to an appliance for installing the crankshaft oil seal of the heavy-duty car engine. The installation tool involves an engine shell, a crankshaft and an oil seal, the oil seal is embedded into an oil seal base hole of the engine shell, and the installation tool is characterized by comprising a positioning sleeve, an impact pressing plate, a sliding hammer and a sliding rod; the front end of the positioning sleeve is matched with the oil seal and abuts against the oil seal. The impact pressing plate covers the rear end of the positioning sleeve; the front end of the sliding rod is in threaded connection with the impact pressing plate; the sliding hammer is arranged between the impact pressing plate and the limiting boss of the sliding rod.

SUMMARY OF THE DISCLOSURE

In one aspect of the present disclosure, an installation tool for installing a seal is provided. The installation tool includes a shaft defining a first end, a second end opposite to the first end, and a length defined between the first and second ends. The installation tool also includes a seal-engaging component coupled with the shaft proximal to the first end of the shaft. During an installation of the seal, the seal-engaging component is adapted to couple with the seal such that the seal is coaxial with the seal-engaging component. The seal-engaging component includes a first surface disposed proximal to the first end of the shaft. The seal-engaging component also includes a second surface disposed distal to the first end of the shaft and opposite to the first surface. The seal-engaging component further includes a first annular ring extending axially from the first surface. The first annular ring is adapted to engage with the seal for coupling the seal with the seal-engaging component. The seal-engaging component includes a second annular ring extending axially from the first surface and concentric with the first annular ring, such that, during the installation of the seal, a portion of the seal is radially disposed between the first annular ring and the second annular ring. The installation tool further includes a sliding hammer mounted on the shaft and adapted to slide along the length of the shaft. During the installation of the seal, the sliding hammer is adapted to apply a force to the seal-engaging component based on a sliding of the sliding hammer towards the first end of the shaft for installing the seal at a seal installation location.

In another aspect of the present disclosure, a method of installing a seal using an installation tool is provided. The method includes aligning the seal with a seal-engaging component of the installation tool. The installation tool includes a shaft defining a first end, a second end opposite to the first end, and a length defined between the first and second ends, such that the seal-engaging component is coupled with the shaft proximal to the first end of the shaft. The method also includes coupling the seal with the seal-engaging component based on an engagement of the seal with a first annular ring extending axially from a first surface of the seal-engaging component. The seal-engaging component further includes a second annular ring extending axially from the first surface and concentric with the first annular ring, such that, based on the coupling of the seal with the seal-engaging component, a portion of the seal is radially disposed between the first annular ring and the second annular ring. The method further includes positioning the seal and the installation tool adjacent to a seal installation location, such that the seal is axially positioned between the seal installation location and the seal-engaging component. The method includes sliding a sliding hammer mounted on the shaft towards the first end of the shaft for applying a force to the seal-engaging component. The method also includes installing the seal at the seal installation location based on the force applied to the seal-engaging component.

In yet another aspect of the present disclosure, a seal-engaging component associated with an installation tool for installing a seal is provided. The seal-engaging component includes a first surface. The seal-engaging component also includes a second surface disposed opposite to the first surface. The seal-engaging component further includes a first annular ring extending axially from the first surface. The first annular ring is adapted to engage with the seal for coupling the seal with the seal-engaging component such that the seal is coaxial with the seal-engaging component. The seal-engaging component includes a second annular ring extending axially from the first surface and concentric with the first annular ring, such that, during the installation of the seal, a portion of the seal is radially disposed between the first annular ring and the second annular ring.

Other features and aspects of this disclosure will be apparent from the following description and the accompanying drawings.

DETAILED DESCRIPTION

Wherever possible, the same reference numbers will be used throughout the drawings to refer to the same or like parts. Wherever possible, corresponding or similar reference numbers will be used throughout the drawings to refer to the same or corresponding parts.

Figure 1:
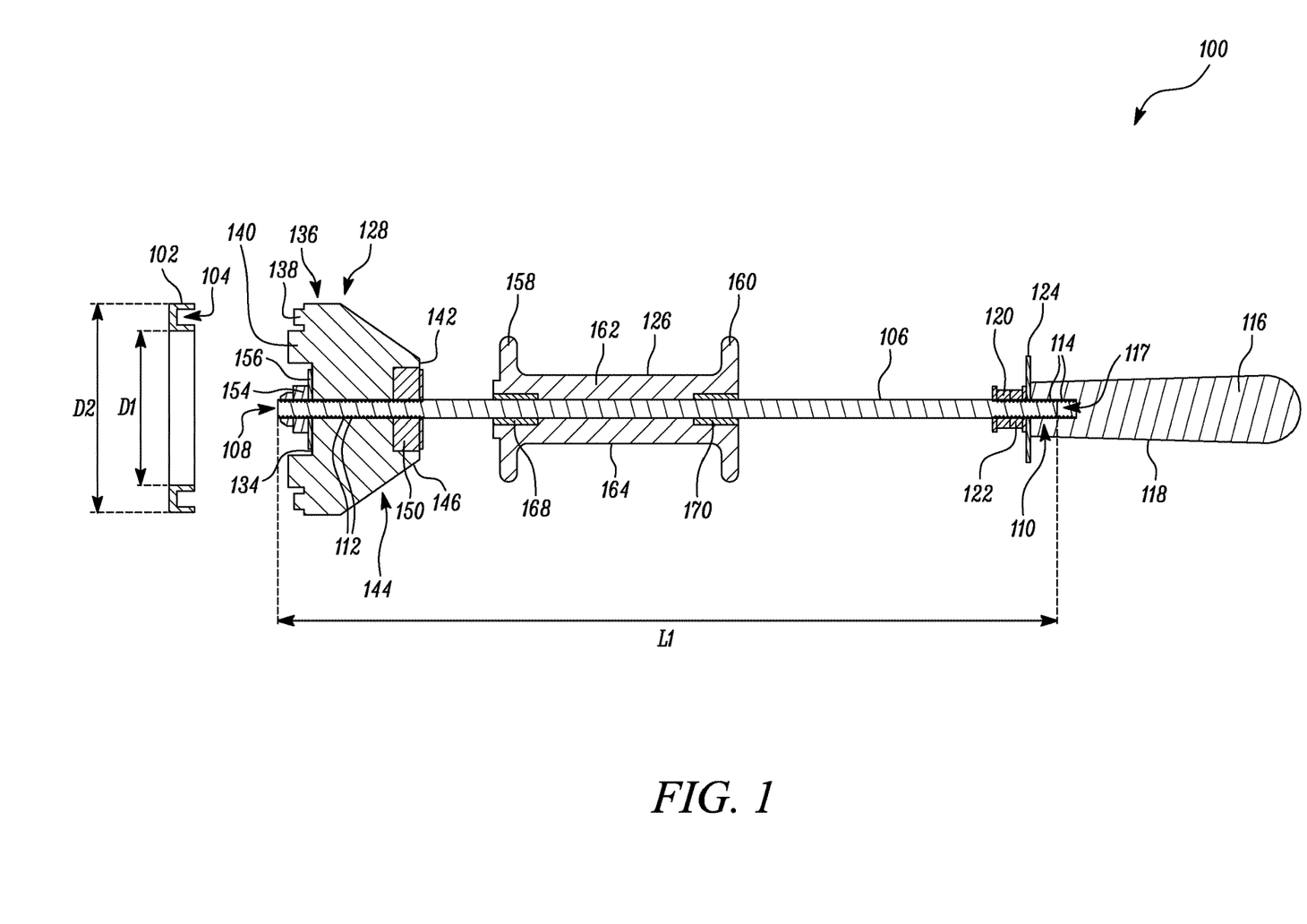
FIG. 1 illustrates a cross-sectional side view of an installation tool, according to examples of the present disclosure.

FIG. 1 illustrates a cross-sectional side view of an exemplary installation tool 100 for installing a seal 102. The seal 102 may be associated with a stationary machine (not shown) or a movable machine (not shown). The seal 102 may prevent passage of liquids, such as lubricants, coolants, or oil, or gases therethrough. In some examples, the seal 102 may be installed in one or more components of a construction machine (not shown). Further, the seal 102 may be associated with one or more components of an engine system (not shown), such as valves, crankshafts, and the like. Moreover, the seal 102 may embody a ring seal associated with one or more gears (not shown) of the stationary machine or the construction machine.

In the illustrated embodiment of FIG. 1, the seal 102 includes a generally annular design herein. The seal 102 defines an inner diameter "D1" and a first outer diameter "D2". The seal 102 may define a groove 104. Further, the seal 102 may be made of a flexible material. In an example, the seal 102 may be made of an elastomeric material, without any limitations. In various examples, the seal 102 may include a gasket, a circlip seal, and the like. It should be noted that an application, a design, and a type of the seal 102 does not limit the scope of the present disclosure.

As illustrated in FIG. 1, the installation tool 100 includes a shaft 106 defining a first end 108, a second end 110 opposite to the first end 108, and a length "L1" defined between the first and second ends 108, 110. In some examples, the shaft 106 may be made from a metal, without any limitations. In an example, the shaft 106 may be made of steel, without any limitations. The shaft 106 includes a number of first external threads 112 defined proximal to the first end 108. Further, the shaft 106 includes a number of second external threads 114 defined proximal to the second end 110. The shaft 106 has a generally circular cross-section.

Further, the installation tool 100 includes a handle 116 threadedly coupled with the shaft 106 proximal to the second end 110 of the shaft 106. More particularly, the handle 116 includes internal threads (not shown) that engage with the second external threads 114 at the second end 110 of the shaft 106 for coupling of the handle 116 with the shaft 106. A portion of the second end 110 of the shaft 106 is received within an aperture 117 of the handle 116. The handle 116 includes a generally tapering profile. The handle 116 defines a first gripping surface 118 that may be gripped by an operator. In an example, the handle 116 may include one or more textures on the first gripping surface 118 that may allow comfortable and easy gripping of the handle 116 by the operator. In some examples, the first gripping surface 118 may include a knurled surface. Further, the handle 116 may be made from a plastic material, without any limitations.

The installation tool 100 also includes a pair of flanged nuts 120, 122. Each flanged nut 120 engages with the second external threads 114 at the second end 110 of the shaft 106 for coupling of the flanged nuts 120, 122 with the shaft 106. Further, the installation tool 100 includes a first washer 124. The first washer 124 is disposed between the flanged nut 122 and the handle 116. The first washer 124 and the flanged nuts 120, 122 may together eliminate a contact between a sliding hammer 126 of the installation tool 100 and the handle 116. In an example, the first washer 124 may include a fender washer.

The installation tool 100 also includes a seal-engaging component 128 coupled with the shaft 106 proximal to the first end 108 of the shaft 106. During an installation of the seal 102, the seal-engaging component 128 couples with the seal 102 such that the seal 102 is coaxial with the seal-engaging component 128. In some examples, the seal-engaging component 128 may be made from a plastic material, without any limitations. In an example, the sliding hammer 126 may be made of nylon, without any limitations.

Figure 2:
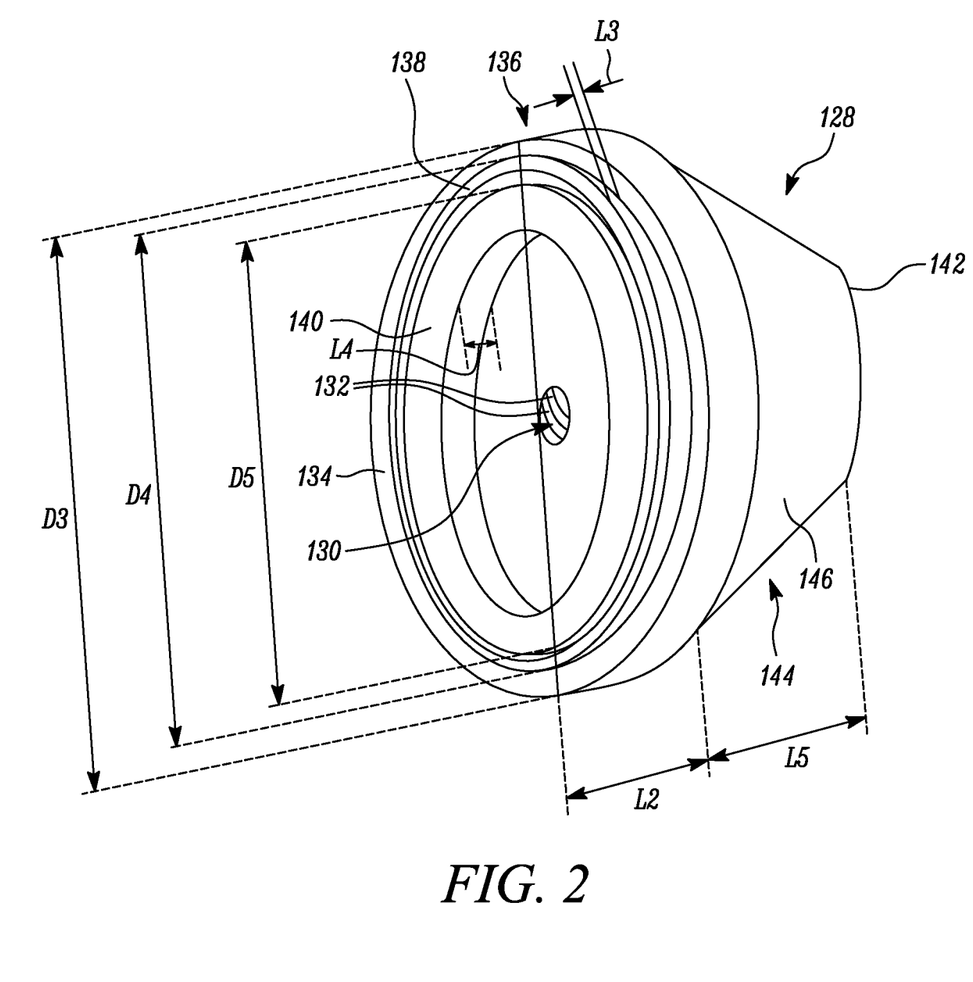
FIG. 2 illustrates a perspective front view of a seal-engaging component associated with the installation tool of FIG. 1, according to examples of the present disclosure.

As shown in FIG. 2, the seal-engaging component 128 includes a first through-aperture 130. In an assembled state of the installation tool 100, the first through-aperture 130 receives a portion of the shaft 106 (see FIGS. 1 and 3). Moreover, the seal-engaging component 128 defines a number of internal threads 132 facing the first through-aperture 130. The internal threads 132 engage with some of the first external threads 112 (see FIGS. 1 and 4) on the shaft 106 (see FIGS. 1 and 4) for threadedly coupling the seal-engaging component 128 with the shaft 106.

The seal-engaging component 128 includes a first surface 134 disposed proximal to the first end 108 (see FIG. 1) of the shaft 106. Specifically, the seal-engaging component 128 includes a first portion 136 disposed proximal to the first end 108 of the shaft 106 and defining the first surface 134. The first portion 136 has a generally circular cross-section. Further, the first portion 136 defines a first length "L2" and a second outer diameter "D3". In some examples, the second outer diameter "D3" may be substantially equal to the first outer diameter "D2" (see FIG. 1) of the seal 102 (see FIG. 1).

The seal-engaging component 128 also includes a first annular ring 138 extending axially from the first surface 134. The first annular ring 138 engages with the seal 102 for coupling the seal 102 with the seal-engaging component 128. The first annular ring 138 is concentric with the first through-aperture 130. The first annular ring 138 defines a first diameter "D4". Further, the first annular ring 138 defines a first axial length "L3". The first annular ring 138 is received within the groove 104 (see FIG. 1) defined by the seal 102 for coupling the seal-engaging component 128 with the seal 102. In some examples, a shape of the first annular ring 138 may conform to a shape of the groove 104 so that the seal 102 snugly fits with the first annular ring 138.

Further, the seal-engaging component 128 includes a second annular ring 140 extending axially from the first surface 134 and concentric with the first annular ring 138. The second annular ring 140 is concentric with the first through-aperture 130. The first and second annular rings 138, 140 are radially spaced apart from each other. Further, the second annular ring 140 defines a second diameter "D5". The first diameter "D4" is greater than the second diameter "D5". Further, the second annular ring 140 defines a second axial length "L4" that may be greater than the first axial length "L3" of the first annular ring 138.

During the installation of the seal 102, a portion 172 of the seal 102 is radially disposed between the first annular ring 138 and the second annular ring 140. More particularly, when the seal 102 is coupled with the seal-engaging component 128, the second annular ring 140 may contact the seal 102 proximal to the inner diameter "D1" (see FIG. 1) of the seal 102. It should be noted that one or more dimensions of the seal-engaging component 128, such as the second outer diameter "D3", the first diameter "D4", the second diameter "D5" may vary based on the inner diameter "D1" and the first outer diameter "D2" (see FIG. 1) of the seal 102 to allow coupling of the seal 102 of a specific size with the seal-engaging component 128.

Figure 3:
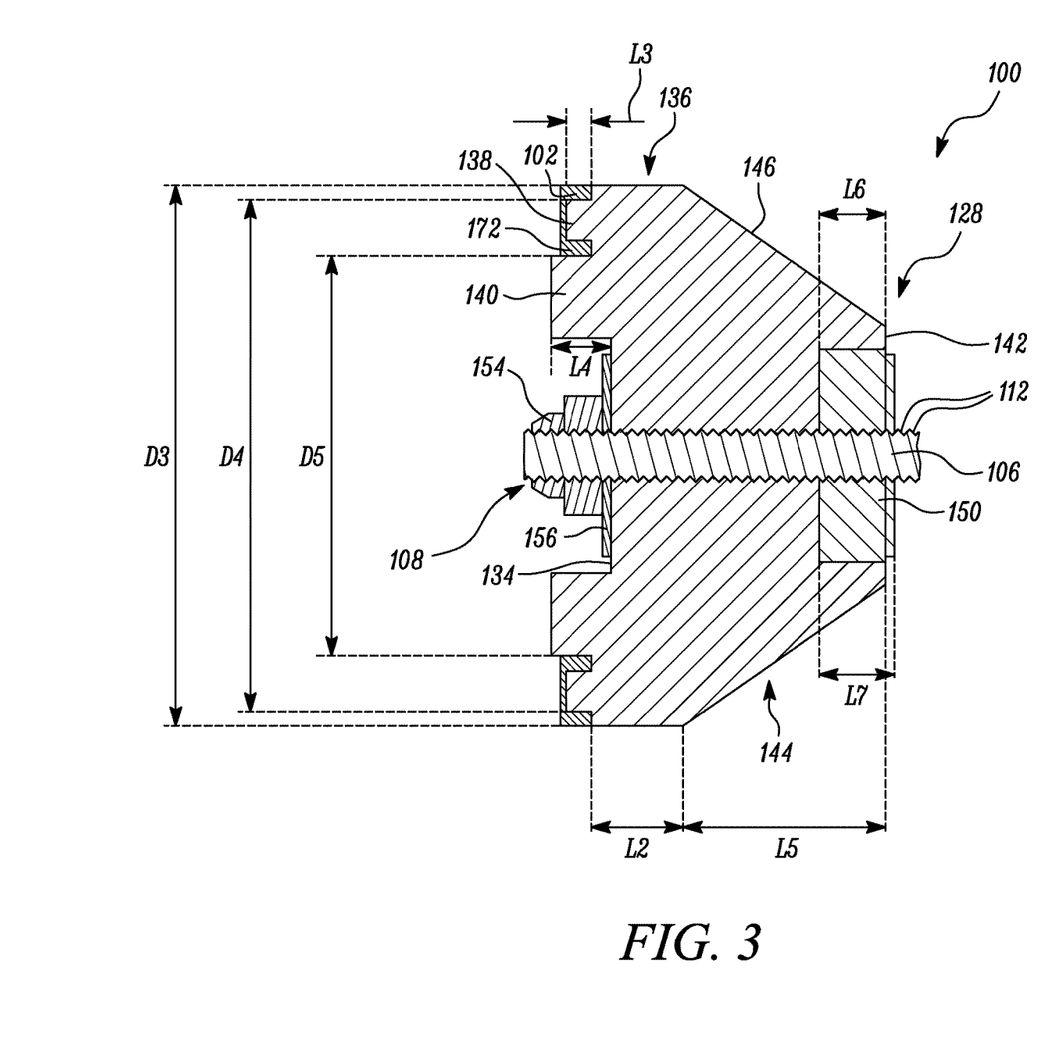
FIG. 3 illustrates a cross-sectional side view of the seal-engaging component of FIG. 2, according to examples of the present disclosure.

As shown in FIG. 3, the seal-engaging component 128 includes a second surface 142 disposed distal to the first end 108 of the shaft 106 and opposite to the first surface 134. More particularly, the seal-engaging component 128 includes a second portion 144 integral with the first portion 136. The second portion 144 is disposed distal to the first end 108 of the shaft 106 and defines the second surface 142. Further, an exterior part 146 of the second portion 144 tapers from the first end 108 of the shaft 106 towards the second end 110 (see FIG. 4) of the shaft 106. The second portion 144 has a generally circular cross-section. Further, the second portion 144 defines a second length "L5" that may be substantially greater than the first length "L2". Further, the seal-engaging component 128 defines a cavity 148 (shown in FIG. 4) partially extending from the second surface 142 toward the first surface 134. The cavity 148 is in communication with the first through-aperture 130. The cavity 148 is circular in shape and extends along a length "L6".

The installation tool 100 includes an impact plate 150 that may be received within the cavity 148 of the seal-engaging component 128. The impact plate 150 is contacted by the sliding hammer 126 (see FIG. 1) for applying a force to the seal-engaging component 128. The impact plate 150 is circular in shape. The impact plate 150 defines a third length "L7". In some examples, the third length "L7" may be slightly greater than the length "L6" of the cavity 148.

Figure 4:
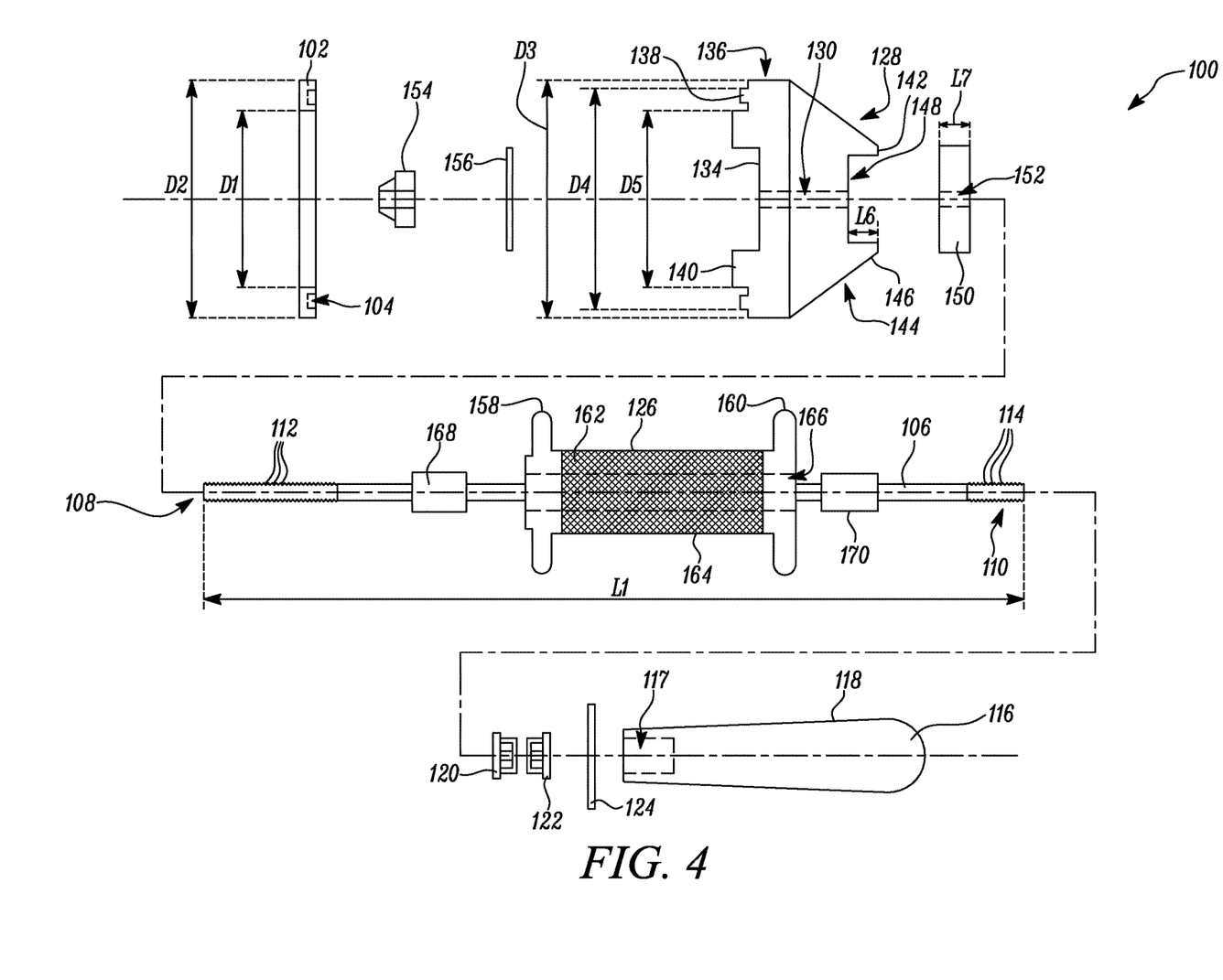
FIG. 4 illustrates an exploded view of the installation tool of FIG. 1, according to examples of the present disclosure.

Further, the impact plate 150 defines a second through-aperture 152 (shown in FIG. 4). In an assembled state of the installation tool 100, the second through-aperture 152 receives a portion of the shaft 106. Each of the seal-engaging component 128 and the impact plate 150 is threadedly coupled with the shaft 106. Specifically, the impact plate 150 defines a number of internal threads (not shown) facing the second through-aperture 152. The internal threads engage with some of the first external threads 112 on the shaft 106 for threadedly coupling the impact plate 150 with the shaft 106. In some examples, the impact plate 150 may be made from a metal, without any limitations. In an example, the impact plate 150 may be made of steel, without any limitations.

The installation tool 100 also includes a nut 154. The nut 154 may include a nylon-insert lock nut. The nut 154 couples with the shaft 106 proximal to the first end 108 and is disposed adjacent to the seal-engaging component 128. Further, the installation tool 100 includes a second washer 156. The second washer 156 is disposed between the nut 154 and the seal-engaging component 128. In an example, the second washer 156 may include a fender washer.

As shown in FIG. 4, the installation tool 100 includes the sliding hammer 126 mounted on the shaft 106 and slidable along the length "L1" of the shaft 106. During the installation of the seal 102, the sliding hammer 126 applies the force to the seal-engaging component 128 based on a sliding of the sliding hammer 126 towards the first end 108 of the shaft 106 for installing the seal 102 at a seal installation location. The sliding hammer 126 includes a first flange portion 158, a second flange portion 160, and a central portion 162 connecting the first and second flange portions 158, 160. The central portion 162 defines a second gripping surface 164 that may be gripped by the operator for sliding the sliding hammer 126 between the first and second ends 108, 110 of the shaft 106. The second gripping surface 164 may include a knurled surface.

Further, the sliding hammer 126 defines a third through-aperture 166. In an assembled state of the installation tool 100, the third through-aperture 166 allows passage of the shaft 106 therethrough. In some examples, the sliding hammer 126 may be made from a metal, without any limitations. In an example, the sliding hammer 126 may be made of steel, without any limitations. Moreover, the installation tool 100 includes one or more bushings 168, 170 that are partially contained within the sliding hammer 126 (as illustrated in FIG. 1). The bushing 168, 170 is dimensioned to accommodate the shaft 106. Further, the bushing 168, 170 is dimensioned to facilitate a movement of the sliding hammer 126 along the shaft 106. In the illustrated embodiment of FIG. 4, the installation tool 100 includes two bushings 168, 170. The bushing 168 is disposed proximal to the first flange portion 158 and the bushing 170 is disposed proximal to the second flange portion 160. In some examples, the bushings 168, 170 may be made from a plastic material, without any limitations.

For assembling the installation tool 100, the sliding hammer 126 and the bushings 168, 170 may be coupled with the shaft 106. Further, the flanged nuts 120, 122, the first washer 124, and the handle 116 may be coupled with the shaft 106 proximal to the second end 110 of the shaft 106. Furthermore, the impact plate 150, the seal-engaging component 128, and the nut 154 may be coupled with the shaft 106 proximal to the first end 108 of the shaft 106. It should be noted that an order in which the different components of the installation tool 100 are coupled with each other, as described herein, is exemplary in nature and the order may vary, without limiting the scope of the present disclosure.

Further, for installing the seal 102, the operator may align and couple the seal 102 with the seal-engaging component 128. Specifically, the seal 102 engages with the first annular ring 138 and the second annular ring 140, such that the seal-engaging component 128 firmly holds the seal 102 thereon. The operator may then position the installation tool 100 along with the seal 102 at the seal installation location. Subsequently, the operator may hold the handle 116 with one hand and the sliding hammer 126 with another end for moving the sliding hammer 126 towards the first end 108 of the shaft 106 until the first flange portion 158 contacts the impact plate 150. A continued force applied by the operator on the sliding hammer 126 may be translated to the seal 102, via the impact plate 150 and the seal-engaging component 128, which may in turn cause the seal 102 to be urged at the seal installation location. Once the seal 102 is installed, the installation tool 100 may be removed.

INDUSTRIAL APPLICABILITY

The present disclosure relates to the installation tool 100 for installing the seal 102. The installation tool 100 includes the seal-engaging component 128 that holds the seal 102 during a seal installation process. Further, the seal 102 engages with the first annular ring 138 of the seal-engaging component 128 whereas the second annular ring 140 may keep the seal 102 centered and aligned. The installation tool 100 described herein may be cost-effective, simple in construction, lightweight, and easy to use.

Further, the installation tool 100 may not apply excessive pressure or forces on the seal 102, thereby eliminating any pinch points or other damages to the seal 102. Moreover, the installation tool 100 may be user friendly, and may eliminate a requirement of holding the seal 102 by the operator. Specifically, the operator may not have to hold the seal 102 in place or use a separate component for holding the seal 102. As the seal 102 is held in place by the seal-engaging component 128, the operator may only hold the sliding hammer 126 and the handle 116 during the seal installation process.

The installation tool 100 includes features, such as the flanged nuts 120, 122 and the first washer 124 which may eliminate any inadvertent contact of the sliding hammer 126 with the operator's hand during the sliding of the sliding hammer 126, thereby eliminating a risk of injury to the operator. The installation tool 100 can be used to install different types and sizes of seals in compact spaces. Further, the installation tool 100 may be easy to assemble and disassemble. Accordingly, a seal-engaging component 128 of a particular size may be easily removed and replaced by another seal-engaging component 128 of a different size, based on a size of the seal 102 to be installed.

Figure 5:
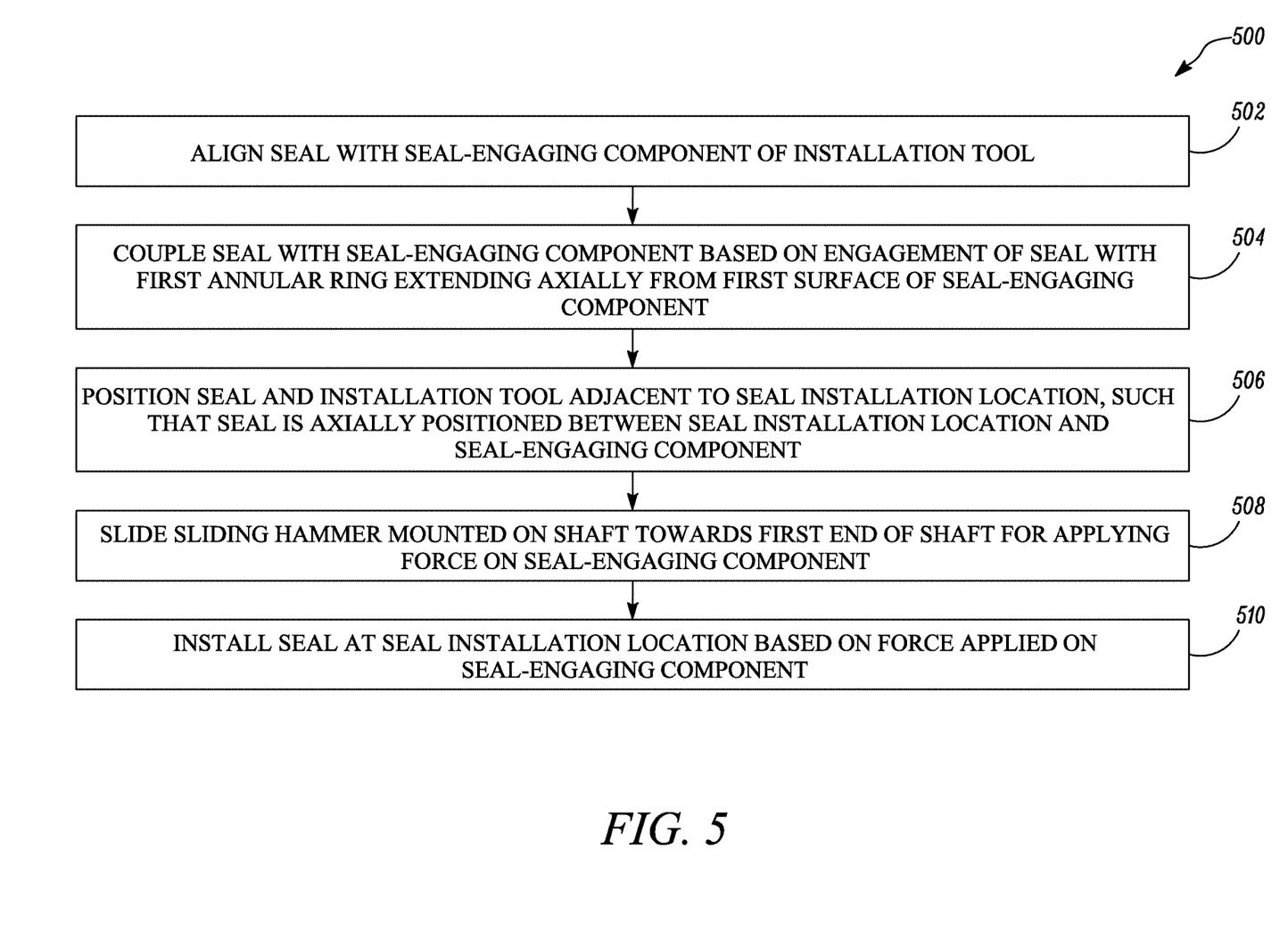
FIG. 5 illustrates a flowchart for a method of installing a seal using the installation tool, according to examples of the present disclosure.

FIG. 5 illustrates a flowchart for a method 500 of installing the seal 102 using the installation tool 100. At step 502, the seal 102 is aligned with the seal-engaging component 128 of the installation tool 100. The installation tool 100 includes the shaft 106 defining the first end 108, the second end 110 opposite to the first end 108, and the length "L1" defined between the first and second ends 108, 110, such that the seal-engaging component 128 is coupled with the shaft 106 proximal to the first end 108 of the shaft 106.

At step 504, the seal 102 is coupled with the seal-engaging component 128 based on an engagement of the seal 102 with the first annular ring 138 extending axially from the first surface 134 of the seal-engaging component 128. The seal-engaging component 128 further includes the second annular ring 140 extending axially from the first surface 134 and concentric with the first annular ring 138, such that, based on the coupling of the seal 102 with the seal-engaging component 128, the portion 172 of the seal 102 is radially disposed between the first annular ring 138 and the second annular ring 140. Further, the first annular ring 138 is received within the groove 104 defined by the seal 102 for coupling the seal 102 with the first annular ring 138. Moreover, the seal-engaging component 128 defines the cavity 148 partially extending from the second surface 142 of the seal-engaging component 128 toward the first surface 134. The second surface 142 is disposed opposite to the first surface 134. Further, the impact plate 150 of the installation tool 100 will be contacted by the sliding hammer 126. The impact plate 150 is received within the cavity 148 defined by the seal-engaging component 128.

At step 506, the seal 102 and the installation tool 100 are positioned adjacent to the seal installation location, such that the seal 102 is axially positioned between the seal installation location and the seal-engaging component 128. At step 508, the sliding hammer 126 mounted on the shaft 106 is slid towards the first end 108 of the shaft 106 for applying the force to the seal-engaging component 128. At step 510, the seal 102 is installed at the seal installation location based on the force applied to the seal-engaging component 128.

It may be desirable to perform one or more of the step shown in FIG. 5 in an order different from that depicted. Furthermore, various steps could be performed together.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof

The invention claimed is:

1. An installation tool for installing a seal, the installation tool comprising:
   a shaft defining a first end, a second end opposite to the first end, and a length defined between the first and second ends;
   a seal-engaging component coupled with the shaft proximal to the first end of the shaft, wherein, during an installation of the seal, the seal-engaging component is adapted to couple with the seal such that the seal is coaxial with the seal-engaging component, the seal-engaging component including:
      a first surface disposed proximal to the first end of the shaft;
      a second surface disposed distal to the first end of the shaft and opposite to the first surface, wherein the seal-engaging component defines a cavity partially extending from the second surface toward the first surface;
      a first annular ring extending axially from the first surface, wherein the first annular ring is adapted to engage with the seal for coupling the seal with the seal-engaging component; and
      a second annular ring extending axially from the first surface and concentric with the first annular ring, such that, during the installation of the seal, a portion of the seal is radially disposed between the first annular ring and the second annular ring;
   a sliding hammer mounted on the shaft and adapted to slide along the length of the shaft, wherein, during the installation of the seal, the sliding hammer is adapted to apply a force to the seal-engaging component based on a sliding of the sliding hammer towards the first end of the shaft for installing the seal at a seal installation location; and
   an impact plate adapted to be received within the cavity of the seal-engaging component, wherein the impact plate is adapted to contact the sliding hammer for applying the force to the seal-engaging component.

2. The installation tool of claim 1, wherein each of the seal-engaging component and the impact plate is threadedly coupled with the shaft.

3. The installation tool of claim 1 further comprising a handle threadedly coupled with the shaft proximal to the second end of the shaft.

4. The installation tool of claim 1, wherein,
   the first annular ring defines a first diameter; and
   the second annular ring defines a second diameter, the first diameter being greater than the second diameter.

5. The installation tool of claim 1, wherein the first annular ring is received within a groove defined by the seal for coupling the seal-engaging component with the seal.

6. The installation tool of claim 1, wherein the seal-engaging component includes:

a first portion disposed proximal to the first end of the shaft and defining the first surface; and a second portion integral with the first portion, the second portion being disposed distal to the first end of the shaft and defining the second surface, wherein an exterior part of the second portion tapers from the first end of the shaft towards the second end of the shaft.

7. The installation tool of claim 1 further comprising at least one bushing at least partially contained within the sliding hammer, the bushing being dimensioned to accommodate the shaft.

8. A method of installing a seal using an installation tool, the method comprising:

aligning the seal with a seal-engaging component of the installation tool, wherein the installation tool includes a shaft defining a first end, a second end opposite to the first end, and a length defined between the first and second ends, such that the seal-engaging component is coupled with the shaft proximal to the first end of the shaft;

coupling the seal with the seal-engaging component based on an engagement of the seal with a first annular ring extending axially from a first surface of the seal-engaging component, wherein the seal-engaging component further includes a second annular ring extending axially from the first surface and concentric with the first annular ring, such that, based on the coupling of the seal with the seal-engaging component, a portion of the seal is radially disposed between the first annular ring and the second annular ring, wherein the seal-engaging component defines a cavity partially extending from a second surface of the seal-engaging component to the first surface, wherein the second surface is disposed opposite to the first surface;

positioning the seal and the installation tool adjacent to a seal installation location, such that the seal is axially positioned between the seal installation location and the seal-engaging component;

sliding a sliding hammer mounted on the shaft towards the first end of the shaft for applying a force to the seal-engaging component;

contacting an impact plate of the installation tool with the sliding hammer, wherein the impact plate is adapted to be received within a cavity defined by the seal-engaging component; and installing the seal at the seal installation location based on the force applied to the seal-engaging component.

9. The method of claim 8 further comprising receiving the first annular ring within a groove defined by the seal for coupling the seal with the first annular ring.

10. A seal-engaging component associated with an installation tool for installing a seal, the seal-engaging component comprising:

a first surface;

a second surface disposed opposite to the first surface;

a first annular ring extending axially from the first surface, wherein the first annular ring is adapted to engage with the seal for coupling the seal with the seal-engaging component such that the seal is coaxial with the seal-engaging component; and a second annular ring extending axially from the first surface and concentric with the first annular ring, such that, during the installation of the seal, a portion of the seal is radially disposed between the first annular ring and the second annular ring wherein the installation tool further includes a shaft defining a first end, a second end opposite to the first end, and a length defined between the first and second ends, and wherein the seal-engaging component is coupled with the shaft proximal to the first end of the shaft, wherein the installation tool further includes a sliding hammer mounted on the shaft and adapted to slide along the length of the shaft, and wherein, during the installation of the seal, the sliding hammer is adapted to apply a force to the seal-engaging component based on a sliding of the sliding hammer towards the first end of the shaft for installing the seal at a seal installation location, wherein the seal-engaging component defines a cavity partially extending from the second surface toward the first surface, wherein the installation tool further includes an impact plate adapted to be received within the cavity of the seal-engaging component, and wherein the sliding hammer is adapted to contact the impact plate for applying the force to the seal-engaging component.

11. The seal-engaging component of claim 10, wherein, the first annular ring defines a first diameter; and the second annular ring defines a second diameter, the first diameter being greater than the second diameter.

12. The seal-engaging component of claim 10, wherein the first annular ring is received within a groove defined by the seal for coupling the seal-engaging component with the seal.

* * * * *